US012157589B2

(12) United States Patent
Ponti

(10) Patent No.: US 12,157,589 B2
(45) Date of Patent: Dec. 3, 2024

(54) PACKAGING MACHINE AND METHOD FOR THE PLACEMENT OF AN ARTICLE ON A PREFORMED CARTON

(71) Applicant: C.M.C. S.P.A., Città di Castello (IT)

(72) Inventor: Lorenzo Ponti, Città di Castello (IT)

(73) Assignee: C.M.C. S.P.A., Città di Castello (IT)

( * ) Notice: Subject to any disclaimer, the term of this patent is extended or adjusted under 35 U.S.C. 154(b) by 229 days.

(21) Appl. No.: 17/801,279

(22) PCT Filed: Mar. 4, 2021

(86) PCT No.: PCT/IB2021/051805
§ 371 (c)(1),
(2) Date: Aug. 22, 2022

(87) PCT Pub. No.: WO2021/181217
PCT Pub. Date: Sep. 16, 2021

(65) Prior Publication Data
US 2023/0099781 A1  Mar. 30, 2023

(30) Foreign Application Priority Data

Mar. 9, 2020 (IT) .......................... 102020000004996

(51) Int. Cl.
*B65B 5/02* (2006.01)
*B65B 35/56* (2006.01)
(Continued)

(52) U.S. Cl.
CPC .............. *B65B 5/024* (2013.01); *B65B 35/56* (2013.01); *B65B 43/10* (2013.01); *B65B 43/54* (2013.01);
(Continued)

(58) Field of Classification Search
CPC B65B 5/024; B65B 5/02; B65B 35/56; B65B 43/10; B65B 57/14; B65B 43/54; B65B 65/003; B65G 47/34
See application file for complete search history.

(56) References Cited

U.S. PATENT DOCUMENTS 4,815,254 A * 3/1989 Fischer ................... B65B 5/024
                                                        53/462
5,010,712 A * 4/1991 Odenthal ................ B65B 57/14
                                                        53/251
(Continued)

FOREIGN PATENT DOCUMENTS

DE     102007046853 B3    12/2008
EP        3070007 A1 *  9/2016  ........... B65B 25/145
(Continued)

OTHER PUBLICATIONS

International Search Report and the Written Opinion of the International Searching Authority, issued in corresponding International Application No. PCT/IB2021/051805, dated Apr. 14, 2021, 9 pages.

*Primary Examiner* — James R Bidwell
(74) *Attorney, Agent, or Firm* — Rothwell, Figg, Ernst & Manbeck, P.C.

(57) ABSTRACT

A machine for packaging articles with a conveyor designed to feed a preformed carton in a feed direction. The machine comprises conveyor belt for placing an article to be packaged on the carton and mobile article holding device, which hold the article during placement, limiting the speed of the article to that of the carton. The placement device comprise a conveyor belt for placement with at least one curved section, designed to convey the article along a curvilinear route, and an alignment station designed to place the article on the placement conveyor belt in a position that ensures the article is placed from the placement conveyor belt onto the carton in a suitable position. The alignment device com-
(Continued)

prises a mobile undercarriage which moves transversely to the article feed direction and a conveyor belt on top of the undercarriage, which is designed to feed the article in the article feed direction.

5 Claims, 3 Drawing Sheets

(51) Int. Cl.
*B65B 43/10* (2006.01)
*B65B 43/54* (2006.01)
*B65B 57/14* (2006.01)
*B65B 65/00* (2006.01)
*B65G 15/02* (2006.01)
*B65G 17/08* (2006.01)
*B65G 47/34* (2006.01)

(52) U.S. Cl.
CPC ............ *B65B 57/14* (2013.01); *B65B 65/003* (2013.01); *B65G 47/34* (2013.01); *B65G 15/02* (2013.01); *B65G 17/086* (2013.01)

(56) References Cited

U.S. PATENT DOCUMENTS

| | | | |
|---|---|---|---|
| 6,151,867 A | 11/2000 | Focke et al. | |
| 9,221,622 B2 * | 12/2015 | Morency | ............ B65G 47/8861 |
| 2010/0256810 A1 | 10/2010 | Weber | |

FOREIGN PATENT DOCUMENTS

| | | | | |
|---|---|---|---|---|
| EP | 3464086 A1 | 4/2019 | | |
| WO | WO-2014118631 A1 * | 8/2014 | ............ | B65B 5/024 |
| WO | 2017203399 A1 | 11/2017 | | |

* cited by examiner

PACKAGING MACHINE AND METHOD FOR THE PLACEMENT OF AN ARTICLE ON A PREFORMED CARTON

CROSS REFERENCE TO RELATED APPLICATION(S)

This application is a 35 U.S.C. § 371 National Phase Entry Application from PCT/IB2021/051805, filed Mar. 4, 2021, designating the United States, and also claims the benefit of Italian Application No. 102020000004996, filed Mar. 9, 2020, the disclosures of which are incorporated herein by reference in their entirety.

DESCRIPTION

The present invention relates to a packaging machine and a method for positioning articles to be packaged in a machine for packaging articles in cartons.

Cartons of various types which are suitable for packaging and effectively protecting the articles are commonly known. A particularly advantageous example from these points of view is described in application EP 3 093 246 A1 filed in the name of the Applicant. The said carton can be made to measure for the individual articles by packaging machinery equipped with means for measuring the articles to be packaged, cutting and creasing the cartons, in particular starting from a continuous cardboard web (reel or fan-folded, or produced in any other commonly known way), means for creating dies, for positioning the articles on the cartons once suitably folded and glued, and for subsequent closing the said cartons around the articles. Cutting and creasing are carried out according to the measurements of the item, which are taken using appropriate means, and the article is placed on the cut and folded carton, which is subsequently closed up around the article through further folding and gluing operations. Human involvement is limited to the loading of individual articles onto a conveyor belt of the machine.

Machinery of this kind is described in applications EP 3 463 844 A1, EP 3 464 085 A1, and EP 3 464 086 A1 and in patents EP 3 464 074 B1 and EP 3 464 073 B1, filed in the name of the Applicant, which concern various solutions suitable therefor.

In some of the existing machinery, such as the machines to which the aforesaid documents refer, the solution adopted for positioning the articles on the cartons comprises a conveyor belt arranged transversely to the carton feed direction. The need to position the article to be packed in a precise position on the carton makes it necessary to use a mobile undercarriage onto which the cross belt conveys the article. The mobile undercarriage is equipped with a conveyor belt which is also movable in a transverse direction with respect to the carton feed direction. The conveyor belt on the undercarriage brings the article into position above the carton, including therein by means of a holding element which is positioned by the machinery, so that the article has a margin around it with respect to the carton. The mobile undercarriage is first placed with one end at the holding element, where it receives the article from the transverse conveyor belt, and pushes the article against the holding element with its own conveyor belt. The mobile undercarriage then retracts, transversely to the direction of the cartons (for example underneath the transverse conveyor belt), still pushing the article against the holding element with its own conveyor belt, and placing the article on a third conveyor belt, which conveys the article parallel to the carton, which is travelling in the machine, below the third conveyor belt. The system described allows precise placement since the articles are inserted transversely with respect to the carton formation and packaging machine, in which the cartons follow a straight route from the cutting of the cardboard web to the closing up thereof around the articles.

However, the presence of the mobile undercarriage, in particular at the packaging machine, is constructively complex and slows down the feeding of the articles to the cartons, reducing the machine's productivity. It would therefore be desirable to have a system for positioning the article and placing it on the carton that does not stop the article feeding.

These objects have now been achieved according to the present invention by means of a machine for packaging articles designed to feed a preformed carton in a feed direction, the said machine comprising means for placing an article to be packaged on the said carton and mobile article holding means, which hold the article during placement, limiting the speed of the article to that of the carton, the said machine being characterised by the fact that the said placement means comprise a conveyor belt for placement with at least one curved section, which conveys the article along a curvilinear route, and an alignment station designed to place the article on the said placement conveyor belt in a position that ensures the article is placed from the placement conveyor belt onto the carton in a suitable position, the said alignment means comprising a mobile undercarriage which moves transversely to the article feed direction and a conveyor belt on top of the undercarriage, which is designed to feed the article, while on the mobile undercarriage, in the article feed direction.

The term 'preformed carton' means a suitably cut carton, equipped with appropriate creasing to form the packaging and which may already be glued where appropriate, as in the case of the carton described in the documents mentioned above. In particular, it means the carton at every stage of the formation thereof and therefore the said carton can reach the point where the article is placed already suitably folded.

The invention will now be better described by illustrating preferred embodiments, provided by way of example, without limiting the scope of protection of the patent and with particular reference to the figures, in which.

Figure 1:
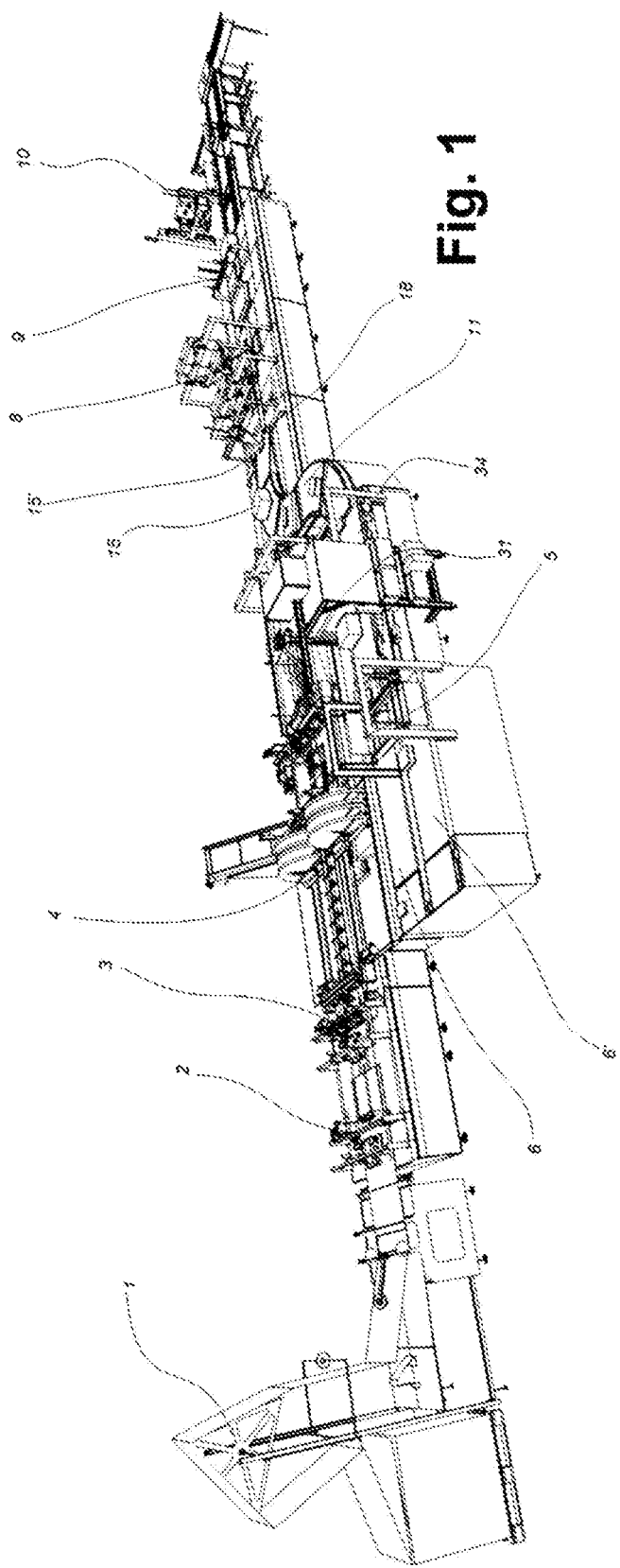
FIG. 1 shows, schematically, a perspective view of a machine according to the present invention as a whole.

A machine according to the invention is shown in FIG. 1.

In this machine, a cardboard web 1 is fed by commonly known means, as a reel or fan-folded or made in another suitable way, for example as described in applications EP 3 529 050 or IT 102018000009606. A first cutting station 2 separates a rectangular portion from the web, for the creation of a carton following further formation steps. The carton proceeds on a suitable conveyor and reaches a creasing station 3 designed to create suitable creases, both longitudinally and transversely to the carton feed direction. A second cutting station 4 is designed to perform a series of cuts. According to a preferred aspect of the invention, the said cutting station may be made, for example, according to the teachings of EP 3 464 073 A1. According to a further aspect, this solution may be modified by doubling the number of cutting units. In this way the transversal cuts, on the transversal creases of the carton produced according to this document, could be made in a single step instead of two, eliminating the need to slow down or stop the carton during the formation thereof. Obviously, it should be made possible to space the various cutting units at the same time in a suitable way, so that they are positioned over the creases at the same time.

This is followed by a gluing station, where the glue is applied in a suitable position, and a folding station. In the case exemplified, the carton reaches position 7, where the article to be packaged is placed with the reinforcement flaps glued onto the central portion and the lateral closing flaps open, to allow placement of the article. The folding station may be similar to that described in one of the applications mentioned above, or it may be made so that it closes up all the reinforcing and closing flaps and then reopens the lateral closing flaps with suitable reopening means. This makes it possible to create a much simpler folding station, which does not require the carton to make stops on the conveyor.

After the article has been placed on the carton, the carton and article reach a further folding and gluing station 8 and a final closing station 9. The latter may be made as in EP 3 464 074 B1. According to a still further aspect, the closing station may be produced on a mobile undercarriage, equipped with a conveyor belt. This way, the mobile undercarriage allows the closing station to process the article and the carton with them stationary in relation to the station, without—however—stopping the motion of the article and carton on the machine's conveyor.

Further processing stations 10 may follow, for example for labelling.

Figure 2:
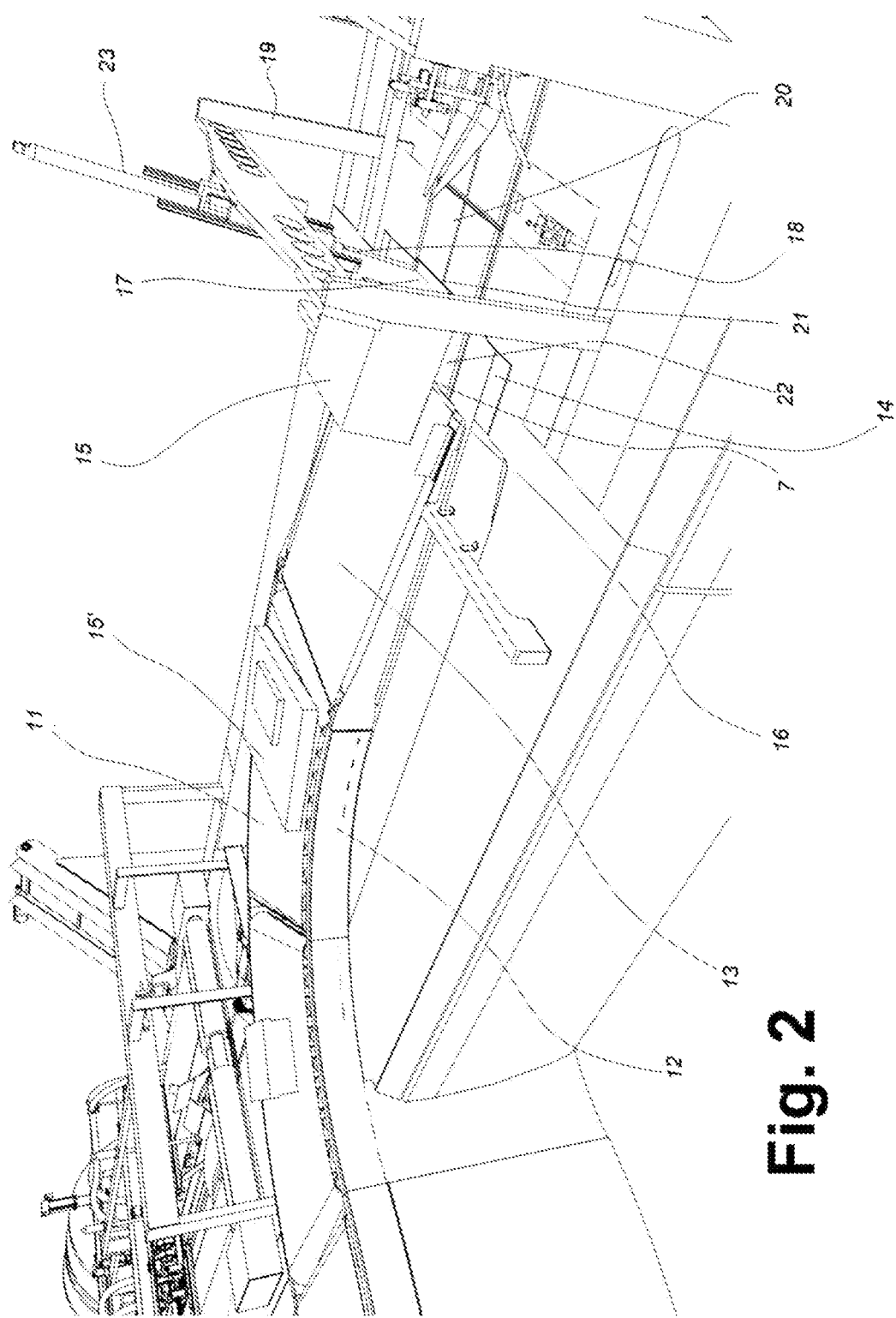
FIGS. 2 and 3 show, schematically, perspective views of a detail of the machine in FIG. 1.

According to the present invention, the placement of the article on the preformed carton takes place at point 7. The article is conveyed by a placement conveyor belt, so that it is over the conveyor on which the preformed carton is travelling. With reference to FIG. 2, the placement conveyor belt 11 comprises a curved section 12. It may also comprise a final straight section 13 at the end of which is point 7 for placing the article on the carton.

It should be noted that the carton 14 feed direction and the article 15 feed direction are the same at point 7. The straight section may have a slight downwards tilt so that the thickness (in particular, the diameter of the conveyor belt 16 tensioning roller) is minimal near point 7 and the tilt of the article is optimal to ensure the article, or better one of the edges 17 thereof, is resting on the carton as soon as the article leaves the conveyor belt. A holding element 18, mounted on a mobile structure 19 is able to hold the article at point 7, where it leaves the conveyor belt, so that the edge 17 thereof is aligned with the area of the carton where it will have to remain once packed, for example in correspondence with the crease 21 that will constitute the fold separating a side 20 and the bottom 22 of the carton once closed. As the carton travels, the holding element 18 accompanies the article at the same speed as the carton, thanks to the mobile structure 19 which can travel in the said feed direction for a sufficient distance, until it has completely left the conveyor belt and is resting entirely on the carton. Appropriate lifting means 23 are designed to lift the holding element 18, removing it as the carton and the article move towards the further processing stations. The mobile structure 19 can then travel in the opposite direction, bringing the holding element 18 back to point 7, where the said holding element can be lowered by the lifting means to intercept the subsequent article 15' and repeat the cycle. The mobile structure can be moved in a commonly known way, for example with a motorised undercarriage and a hydraulic or pneumatic system. The same applies to the means for lifting the holding element.

FIG. 1 shows a loading station where one or more operators can load the articles to be packaged onto the machinery. According to a preferred aspect, a double loading station is provided, given that high productivity machines are suitable for processing a large number of articles per unit of time, with the result that two operators loading in parallel may be required. The loaded articles are transported by the loading conveyor belts 6, 6'. The articles loaded onto the second of the loading conveyor belts 6' can be subsequently moved with special means 5 onto the first of the loading conveyor belts 6, alternating the articles with those loaded there directly by one of the operators.

The means 5 may be of a commonly known type. For example, a pair of pushing elements, motorised with a system of chains or belts, can push the articles sideways onto the loading conveyor belt 31, using a sensor that detects the presence of the article and moves the chain system.

The loading conveyor belt 6, onto which the articles are loaded (suitably aligned), carries the articles to a measuring station 31 (also of a commonly known type) which measures the dimensions (generally three dimensions) of each article. This data is used to form the individual cartons, which will be made on the basis of the measurements of the articles, starting from the material fed by reel or fan-folded web. Furthermore, this data is used in the alignment station 34 to align the articles before the placement conveyor belt.

Figure 3:
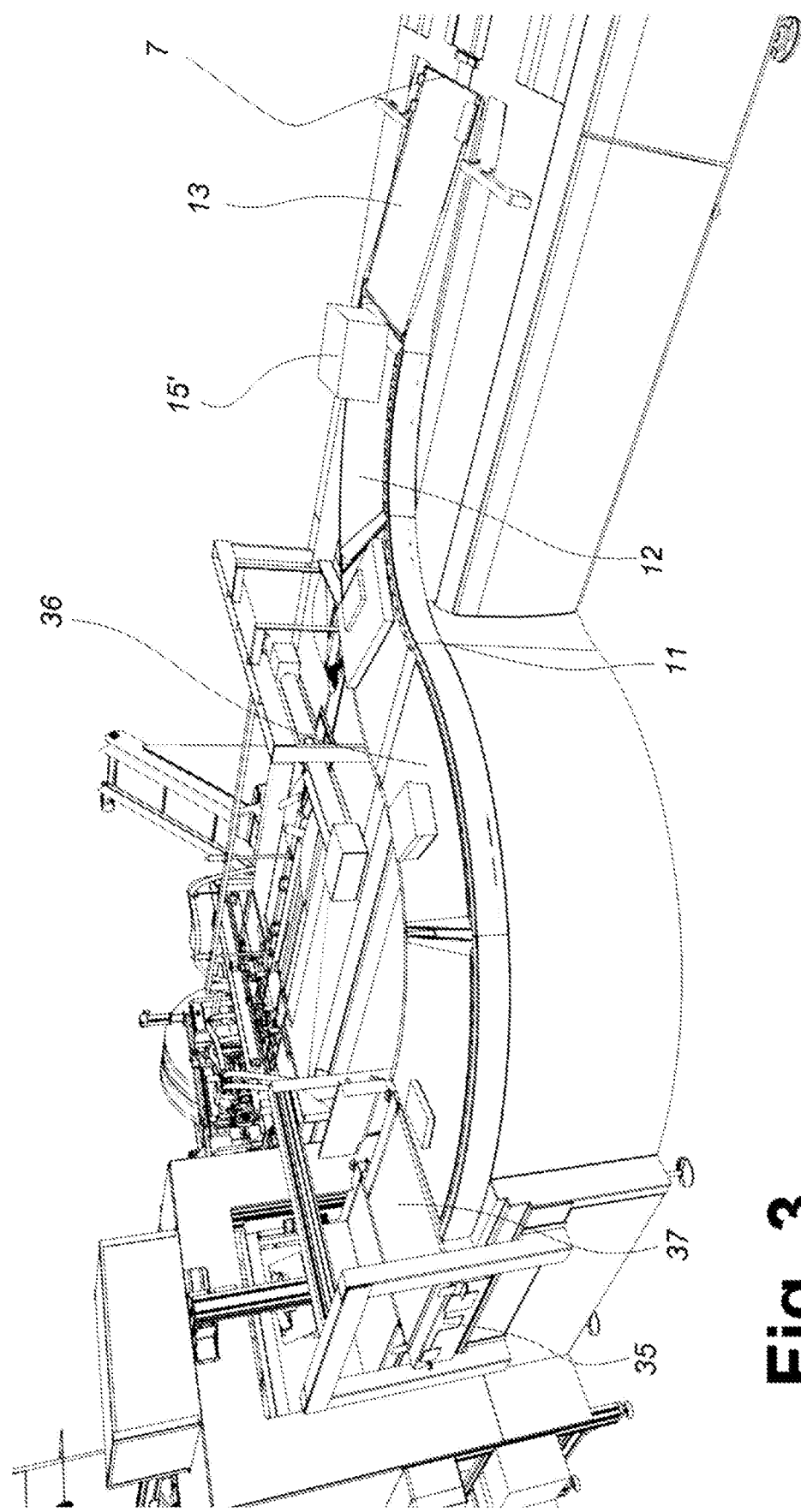

With reference to FIG. 3, the alignment station 34 is designed to use the measurements of each article to align the article appropriately with respect to the curved conveyor belt, for example, exactly in the centre.

As already mentioned, the station may comprise a mobile undercarriage 35. The undercarriage can travel transversely to the article feed direction. The conveyor belt on the undercarriage 37 allows the article to continue travelling in the feed direction in the section between the loading conveyor belt 6 and the placement conveyor belt 11. The transverse movement of the undercarriage moves article transversely from the position it occupies on the loading conveyor belt (which may be, for example, a lateral position against a lateral stop located along a lateral edge of the loading conveyor belt, where it is placed by the operator or pushed by the pushing elements as seen above) to the position on the placement belt, for example in the centre thereof, considering that the cardboard is preferably cut (also reducing its width) and creased symmetrically with respect to the conveyor, and therefore reaches the placement point 7, which is also positioned centrally with respect to the placement belt.

The placement belt comprises a curved section 12. The curved conveyor belts are a commonly known type. According to the present invention, this feature allows the articles to be placed on the carton in the same feed direction as the carton, without the need to stop the latter, despite the loading conveyor belt being oriented in a different direction (in particular, transversely or laterally to the carton conveyor), and there also being an alignment station which is not directly above the route of the cartons, thereby constructively simplifying the machine. Furthermore, points with changes of direction at right angles (which require a complex alignment system such as those of the prior art) are avoided.

The placement conveyor belt comprises at least one curved section. According to a still further aspect of the invention, the said belt includes at least two curved sections 12 and 38 with opposing curvatures, forming an S-shaped portion of the belt. In this way, there can be a loading conveyor belt, as in the case exemplified in the figures, parallel to the carton conveyor, thus reducing the overall dimensions of the machinery.

The invention also relates to a method for placing articles on preformed cartons, in particular a method carried out in a machine as described.

The invention claimed is:

1. Machinery for packaging articles with a conveyor designed to convey an unassembled carton in a feed direction, the said machinery comprising:
   means for placing an article to be packed onto the said carton; and
   movable means for holding the article during placement and limit the speed thereof to that of the said carton,
   wherein the said placement means comprise a placement conveyor belt with at least one curved section, designed to provide a curved route to the article and an alignment station designed to enable the placement of the article on the said placement conveyor belt in such a position that, from the placement conveyor belt, the article is then placed on top of the carton in a suitable position, the said alignment means comprising an undercarriage which is movable in a transverse direction to the article feed direction and a conveyor belt of the undercarriage designed to convey the article on top of the undercarriage which is movable in the article feed direction.

2. Machinery according to claim 1, wherein the said placement conveyor belt comprises at least two curved sections with opposing curvatures.

3. Machinery according to claim 2 comprising one or more loading conveyor belts arranged parallel to the carton feed direction.

4. Machinery according to claim 1, wherein the said placement conveyor belt comprises a straight end section.

5. A method for placing an article on top of an unassembled carton comprising the loading of the said article onto a machine according to claim 1.

* * * * *